(12) United States Patent
Fogg

(10) Patent No.: US 7,952,477 B2
(45) Date of Patent: May 31, 2011

(54) DOOR LOCK ASSEMBLY

(76) Inventor: Benjamin Fogg, Holland, MI (US)

( * ) Notice: Subject to any disclaimer, the term of this patent is extended or adjusted under 35 U.S.C. 154(b) by 0 days.

(21) Appl. No.: 12/720,257

(22) Filed: Mar. 9, 2010

(65) Prior Publication Data

US 2010/0154495 A1    Jun. 24, 2010

Related U.S. Application Data

(63) Continuation-in-part of application No. 12/151,368, filed on May 6, 2008.

(51) Int. Cl.
*E05B 45/06*    (2006.01)

(52) U.S. Cl. ........................................ 340/542

(58) Field of Classification Search ............... 340/542, 340/545.1, 545.6, 545.7, 5.2, 5.7; 70/266, 70/278.1, 279.1; 292/2
See application file for complete search history.

(56) References Cited

U.S. PATENT DOCUMENTS

| | | | | |
|---|---|---|---|---|
| 5,400,722 | A * | 3/1995 | Moses et al. | 109/2 |
| 5,609,051 | A * | 3/1997 | Donaldson | 70/278.7 |
| 5,775,142 | A * | 7/1998 | Kim | 70/277 |
| 2004/0000634 | A1* | 1/2004 | Ballard | 250/221 |
| 2004/0183652 | A1* | 9/2004 | Deng et al. | 340/5.53 |

* cited by examiner

*Primary Examiner* — Phung Nguyen
(74) *Attorney, Agent, or Firm* — King & Partners, PLC

(57) ABSTRACT

A door lock assembly having a housing; a lock sub-assembly which includes, among other members, a bolt and a bolt safety; a user interface member; a secondary electrochemical cell and/or capacitor; and an inertia charger and/or solar cell.

22 Claims, 4 Drawing Sheets

DOOR LOCK ASSEMBLY

CROSS-REFERENCE TO RELATED APPLICATION(S)

This application is a continuation-in-part of co-pending U.S. application Ser. No. 12/151,368, filed May 6, 2008, which is hereby incorporated herein by reference in its entirety—including all references cited therein.

BACKGROUND OF THE INVENTION

1. Field of the Invention

The present invention relates in general to a door lock assembly and, more particularly, to a door lock assembly which reduces the need for maintenance of the same.

2. Background Art

Door lock assemblies have been known in the art for years and are the subject of numerous patents including: U.S. Pat. No. 7,113,070, entitled "Door lock and operation mechanism," U.S. Pat. No. 6,967,562, entitled "Electronic lock control and sensor module for a wireless system," U.S. Pat. No. 5,775,142, entitled "Electronic door lock," U.S. Pat. No. 5,609,051, entitled "Keyless entry system for replacement of existing key locks," U.S. Pat. No. 5,544,507, entitled "Door lock assembly," U.S. Pat. No. 5,505,508, entitled "Door lock assembly," U.S. Pat. No. 4,802,353, entitled "Battery-powered door lock assembly and method," and U.S. Pat. No. 3,891,255, entitled "Door lock assembly"—all of which are hereby incorporated herein by reference in their entirety including all references cited therein.

In addition, various approaches have been taken toward the development of inertia chargers and include those disclosed in U.S. Pat. No. 6,794,783, entitled "Flat rotary electric generator," U.S. Pat. No. 6,717,297, entitled "Electrical machine," U.S. Pat. No. 5,631,507, entitled "Electric power generator," U.S. Pat. No. 5,608,279, entitled "DC generator," U.S. Pat. No. 5,347,186, entitled "Linear motion electric power generator," U.S. Pat. No. 5,089,734, entitled "Dual rotary AC generator," U.S. Pat. No. 4,500,827, entitled "Linear reciprocating electrical generator," U.S. Pat. No. 4,385,246, entitled "Apparatus for producing electrical energy," U.S. Pat. No. 4,217,508, entitled "DC motor," and U.S. Pat. No. 3,673,444, entitled "Rotary electric machine,"—all of which are hereby incorporated herein by reference in their entirety including all references cited therein.

While door lock assemblies have been known in the art for years, issues associated with energy consumption, battery life, and assembly maintenance remain problematic. To be sure, a substantial amount of time must be dedicated to maintaining presently available door lock assemblies—especially with regard to secondary electrochemical cell replacement.

Therefore, it is an object of the present invention to provide a door lock assembly having one or more inertia chargers to reduce and/or eliminate the aforementioned drawbacks associated with presently available door lock assemblies.

These and other objects of the present invention will become apparent in light of the present specification, claims, and drawings.

SUMMARY OF THE INVENTION

The present invention is directed to, in one embodiment, a door lock assembly comprising: (a) a housing, wherein the housing comprises a first wall and a second wall, and wherein the first and second walls are spaced apart from one another to define a cavity therebetween; (b) a lock sub-assembly which comprises: (1) a bolt, wherein the bolt is at least partially positioned within the housing, and wherein the bolt is displaceable between a locked position and an unlocked position; and (2) a bolt safety, wherein the bolt safety is at least partially positioned within the housing, and wherein the bolt safety is positionable between an engaged, locked bolt position and a disengaged, unlocked bolt position; (c) a user interface member, wherein the user interface member is associated with the housing, and wherein the user interface member mechanically and/or electrically communicates with the bolt safety; (d) a secondary electrochemical cell and/or a capacitor, wherein the secondary electrochemical cell and/or capacitor is associated with the housing and communicates with the bolt safety and/or the user interface member; and (e) an energy generator (a.k.a., energy converter), wherein the energy generator comprises an inertia charger and/or a solar cell, and, wherein the energy generator communicates with the secondary electrochemical cell and/or capacitor.

The present invention is also directed to, in one embodiment, a door lock assembly, comprising: (a) a housing, wherein the housing comprises a first wall and a second wall, and wherein the first and second walls are spaced apart from one another to define a cavity therebetween; (b) a lock sub-assembly which comprises: (1) a bolt, wherein the bolt is at least partially positioned within the housing, and wherein the bolt is displaceable between a locked position and an unlocked position; and (2) a bolt safety, wherein the bolt safety is at least partially positioned within the housing, and wherein the bolt safety is positionable between an engaged, locked bolt position and a disengaged, unlocked bolt position; (c) a user interface member, wherein the user interface member is associated with the housing, and wherein the user interface member mechanically and/or electrically communicates with the bolt safety; (d) a secondary electrochemical cell, wherein the secondary electrochemical cell is associated with the housing, and wherein the secondary electrochemical cell communicates with the bolt safety and/or the user interface member; and (e) an inertia charger, wherein the inertia charger communicates with the secondary electrochemical cell. Preferably, the inertia charger is at least partially positioned within the housing.

In a preferred embodiment of the present invention, the door lock assembly further comprises a handle, wherein the handle is at least partially positioned within the housing, and wherein the handle comprises a first position and a second position, and wherein the handle is associated with the bolt.

In another preferred embodiment of the present invention, a first inertia charger is provided which comprises a linear inertia charger, a torsional inertia charger, a vibrational inertia charger, and/or a compressional inertia charger associated with the handle, and wherein a second inertia charger comprises at least one of a linear inertia charger, a torsional inertia charger, a vibrational inertia charger, and/or a compressional inertia charger associated with the bolt.

In yet another preferred embodiment of the present invention, the inertia charger comprises a linear inertia charger associated with the bolt and a torsional inertia charger associated with the handle.

In another aspect of the present invention, the lock sub-assembly further comprises a rectifier, wherein the rectifier is at least partially positioned within the housing. Preferably, the rectifier receives an alternating current from the inertia charger and communicates a direct current to the secondary electrochemical cell.

In a preferred embodiment of the present invention, the lock sub-assembly further comprises a capacitor, wherein the capacitor is at least partially positioned within the housing.

In another preferred embodiment of the present invention, the inertia charger is associated with a hinge on a door.

In yet another preferred embodiment of the present invention, the door lock assembly further comprises a door linkage sub-assembly, wherein the door linkage sub-assembly comprises a mechanical apparatus for regulating movement of a door and an inertia charger, which communicates with the door lock apparatus.

In a preferred embodiment of the present invention, the door lock assembly further comprises a solar cell, wherein the solar cell communicates with the door lock assembly.

In another aspect of the present invention, the secondary electrochemical cell comprises an alkaline, a lead acid, a nickel-cadmium, a nickel metal hydride, a lithium-ion, and/or a lithium ion polymer secondary electrochemical cell.

In a preferred embodiment of the present invention, the user interface member comprises a card access interface, a biometric access interface, an alpha-numeric access interface, a radio frequency identification access interface, an infrared access interface, and/or a magnetic access interface, and combinations thereof.

In another preferred embodiment of the present invention, the door lock assembly further comprises a bolt safety controller, an energy flow controller, and/or an energy switch. Preferably, the energy flow controller communicates with the inertia charger, and/or the energy switch. Additionally, the energy switch preferably comprises a discharge position and a recharge position.

In a preferred embodiment of the present invention, the energy switch, the user interface member, the energy flow controller, the bolt safety, the bolt safety controller, the inertia charger, the solar cell, the capacitor, and/or the secondary electrochemical cell are all in communication with one another.

The present invention is directed to, in one embodiment, a door lock assembly, comprising: (a) a housing, wherein the housing comprises a first wall and a second wall, and wherein the first and second walls are spaced apart from one another to define a cavity therebetween; (b) a lock sub-assembly which comprises: (1) a bolt, wherein the bolt is at least partially positioned within the housing, and wherein the bolt is displaceable between a locked position and an unlocked position; and (2) a bolt safety, wherein the bolt safety is at least partially positioned within the housing, and wherein the bolt safety is positionable between an engaged, locked bolt position and a disengaged, unlocked bolt position; (c) a user interface member, wherein the user interface member is associated with the housing, and wherein the user interface member mechanically and/or electrically communicates with the bolt safety; (d) a secondary electrochemical cell, wherein the secondary electrochemical cell is associated with the housing, and wherein the secondary electrochemical cell communicates with the bolt safety and/or the user interface member; and (e) a solar cell, wherein the solar cell is associated with the door lock apparatus, and wherein the solar cell communicates with the secondary electrochemical cell.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be understood that the invention is not necessarily limited to the particular embodiments illustrated herein.

The invention will now be described with reference to the drawings wherein.

DETAILED DESCRIPTION OF THE INVENTION

Figure 1:
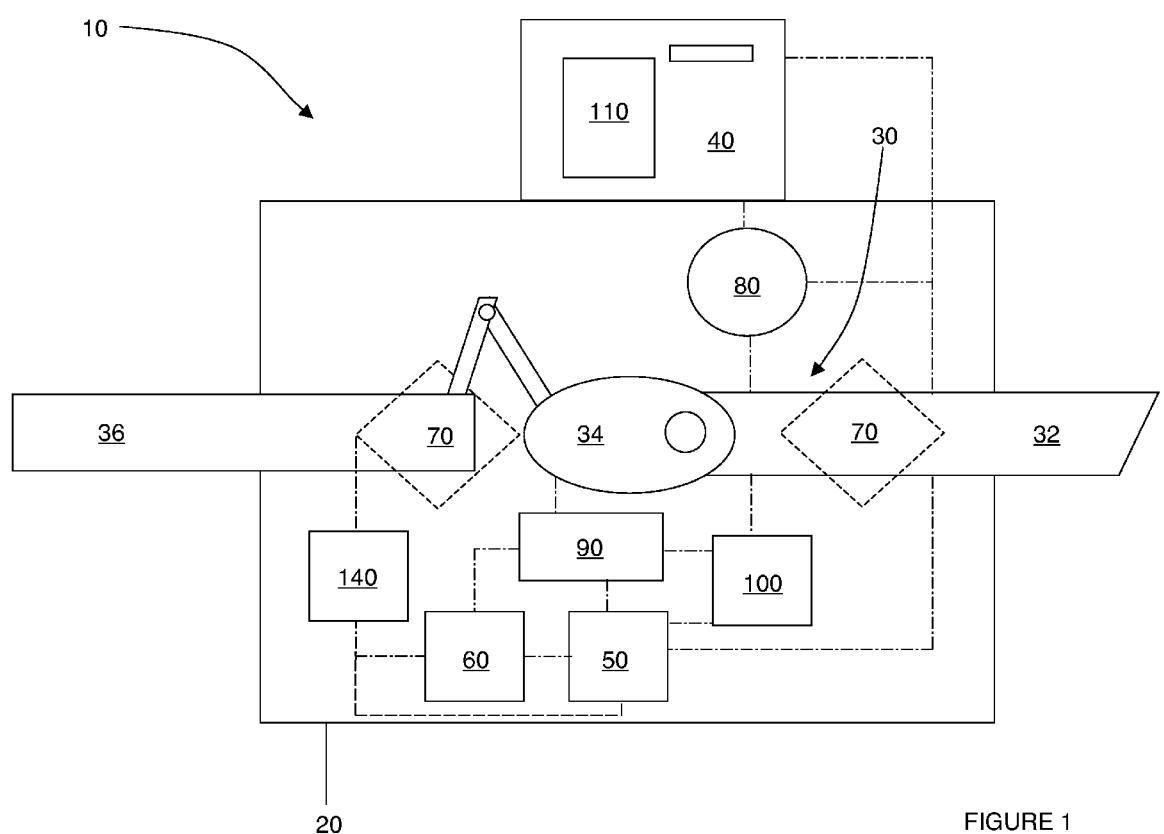
FIG. 1 of the drawings is an elevated side view of a door lock assembly fabricated in accordance with the present invention (locked)

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

Referring now to FIG. 1, door lock assembly 10 is schematically shown as generally comprising housing 20, lock sub-assembly 30, user interface member 40, secondary electrochemical cell 50 (which may be substituted and/or augmented with capacitor 140), optional rectifier 60, one or more optional inertia chargers 70, and one or more optional solar cells 110. It will be understood that door lock assembly 10 preferably includes one or more inertia chargers 70 and/or one or more solar cells 110.

Housing 20 may comprise, for example, a first wall and second wall spaced apart from one another to define a cavity, or may also comprise first and second walls spaced apart from one another, as well as third and fourth walls spaced apart from one another such that the walls form a square, rectangular or other polygonal cavity for retaining, for example, lock sub-assembly 30, user interface member 40, secondary electrochemical cell 50, rectifier 60, inertia charger 70, and/or capacitor 140—among other components. For purposes of the present disclosure, housing 20 is preferably fabricated from natural and/or synthetic resins, plastics, metals, wood, etcetera. However, any one of a number of materials that would be known to those having ordinary skill in the art with the present disclosure before them are likewise contemplated for use. Housing 20 may also be advantageously manufactured from a waterproof material, thereby protecting the contents of the housing from the elements, or other outside contaminates.

Lock sub-assembly 30 is disclosed as at least partially contained within housing 20. For purposes of the present disclosure lock sub-assembly 30 comprises bolt 32, and bolt safety 34.

Bolt 32 is displaceable between a locked position (See FIG. 1) and an unlocked position (See FIG. 2) and serves to secure an associated door to a door frame. Bolt 32 is preferably fabricated from a high tensile strength metal and/or a metallic alloy.

Figure 2:
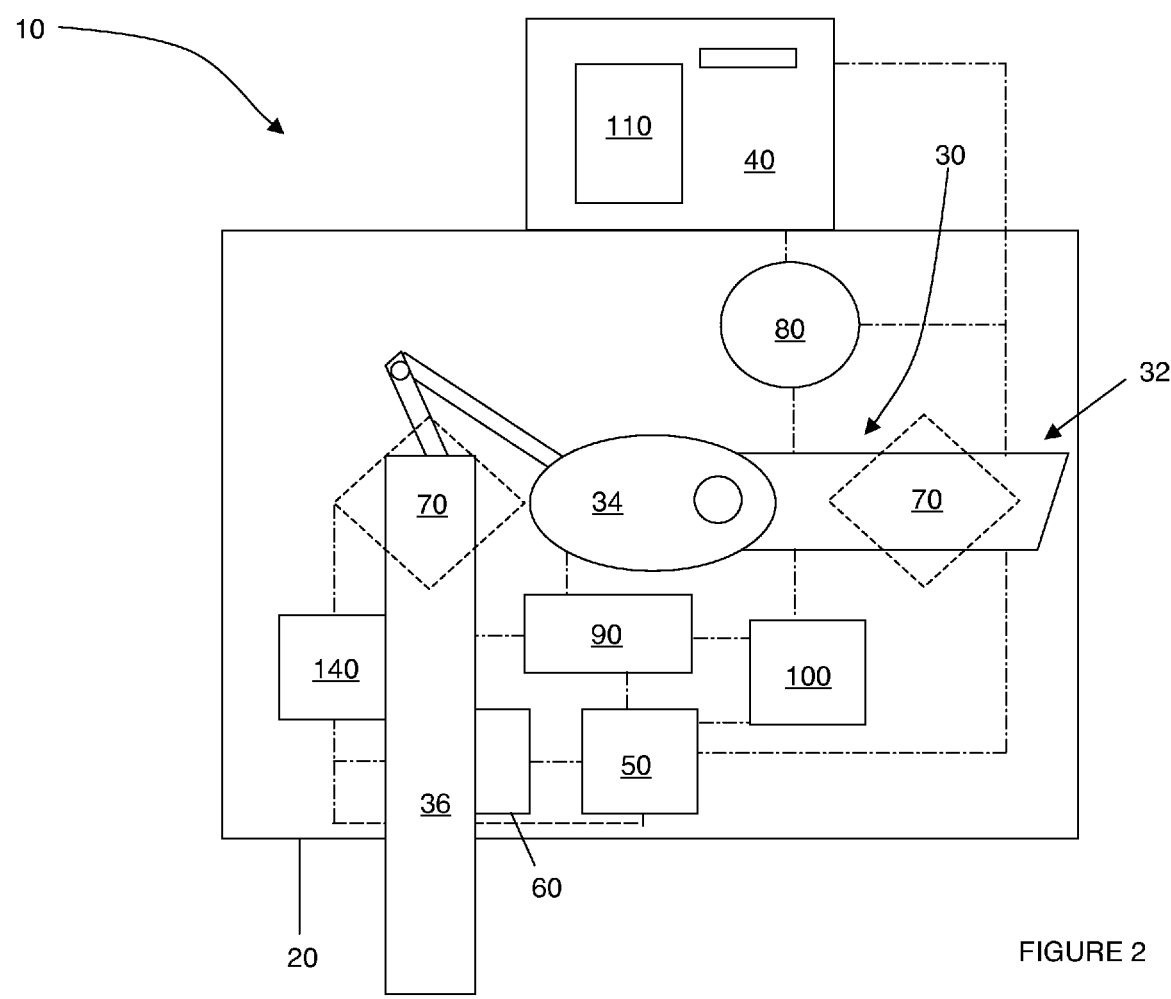
FIG. 2 of the drawings is an elevated side view of a door lock assembly fabricated in accordance with the present invention (unlocked)

Bolt safety 34 is positionable between an engaged, locked bolt position (See FIG. 1), and a disengaged, unlocked bolt position (See FIG. 2). It will be understood that the bolt safety may comprise any mechanism that directly and/or indirectly secures bolt 32 in a locked position. For example, the bolt safety may comprise a solenoid and a pin, where the pin is displaceable by the solenoid into a recess in bolt 32 when the bolt is in a locked position to, in turn, preclude the bolt from being displaced to an unlocked position. Also, bolt safety 34 may comprise a magnet, where the magnet is engaged to secure the bolt in a locked position. It will be understood that any one of a number of traditional bolt safety configurations are suitable for use in accordance with the present invention, including those disclosed in the references incorporated by reference herein.

As is shown in FIG. 1, handle 36 is positioned at least partially within housing 20. Handle 36 may comprise, for example, a sliding mechanism with a knob which slides within a slot, or a common door knob which rotates from a first position (See FIG. 1) to a second position (See FIG. 2). In one embodiment, the handle is associated with bolt 32, and acts to mechanically displace the bolt from the locked position (See FIG. 1) to the unlocked position (See FIG. 2). Such an association may comprise, for example, a set of gears; one associated with handle 36 and another associated with bolt 32, such that when the user turns handle 36 bolt 32 is displaced. A further association may comprise, for example, hinged mechanical linkages which displace bolt 32—for example, when a user turns handle 36. It will be understood that handle 36 may also comprise a gearing system that allows the handle to be disassociated from bolt 32 so that the handle may be turned independently of any bolt displacement. Such a configuration allows a user to turn handle 36 and generate energy via inertia charger 70.

For purposes of the present disclosure, handle 36 is preferably fabricated from a natural and/or synthetic resins, plastics, metals, wood, etcetera. However, any one of a number of materials that would be known to those having ordinary skill in the art with the present disclosure before them are likewise contemplated for use.

Referring now to FIG. 1, user interface member 40 is associated with housing 20, and may comprise, for example, a card access interface, a biometric access interface, an alphanumeric access interface, a radio frequency identification access interface, an infrared access interface, and/or a magnetic access interface, and combinations thereof. By way of example, user interface member 40 may comprise a card access interface. In operation, a user may input an access card into the access card interface which is read by the access card interface. After the access card is read by the access card interface, the access card interface determines whether the access card is valid or invalid. If the access card is valid, then the access card interface communicates an unlock output signal. However, if the access card is invalid, then the access card interface communicates a lock output signal. It will be understood that while an access card interface has been disclosed for illustrative purposes only, any one of a number of user interface members (i.e. access/security members) are likewise contemplated for use in accordance with the present invention.

User interface member 40 may also comprise an inertia charger 70, which utilizes mechanical energy produced from user inputs (e.g. insertion of a card, depressing of a button) and converts the mechanical energy into direct or alternating current for storage and/or use.

Solar cell 110 is shown in FIG. 1 as associated with user interface member 40, although it may be associated with a door, a door frame, or any surrounding structure, as long as solar cell communicates with door lock assembly 10. Solar cell 110 converts light from indoor and/or outdoor lighting sources to direct current electrical energy, which is communicated to secondary electrochemical cell 50 and/or capacitor 140.

Secondary electrochemical cell 50 is shown in FIG. 1 as associated with housing 20. Secondary electrochemical cell 50, may comprise, for example, an alkaline, a lead acid, a nickel-cadmium, a nickel metal hydride, a lithium-ion, and/or lithium ion polymer secondary electrochemical cell. It will be understood that secondary electrochemical cell 50 powers user interface member 40 and/or bolt safety 34.

As is best shown in FIG. 1, rectifier 60, is at least partially positioned within housing 20, and is in electrical communication with secondary electrochemical cell 50 and capacitor 140. Secondary electrochemical cell 50 and/or capacitor 140 receive energy from inertia charger 70. Rectifier 60 may comprise solid state diodes and/or vacuum tube diodes. Preferably, the rectifier will comprise a full wave, three phase bridge rectifier.

In a preferred embodiment of the present invention, inertia charger 70 comprises one or more of a linear inertia charger, a torsional inertia charger, a vibrational inertia charger and/or a compressional inertia charger. For example, the inertia charger may comprise one or more linear inertia chargers, including, but not limited to, consisting of one or two linear inertia chargers. By way of another example, the inertia charger may comprise one or more torsional inertia charger including, but not limited to, consisting of one or two torsional inertia chargers. By way of yet another example, the inertia charger may comprise a linear inertia charger associated with the bolt and a torsional inertia charger associated with the handle.

As is best shown in FIG. 1, in one embodiment for example, inertia charger 70 may comprise a linear inertia charger, which can be attached to bolt 32. In this embodiment, the linear inertia charger preferably further comprises a rotor which can be connected to a portion of bolt 32 inside housing 20. For purposes of the present disclosure, the rotor reciprocates within a stator and produces an alternating current. The linear inertia charger communicates the produced alternating current to rectifier 60 which, in turn, converts the alternating current to direct current. Rectifier 60 communicates the direct current to secondary electrochemical cell 50 for recharging of the same, and/or to capacitor 140 for storage of the same. In a preferred embodiment, bolt 32 may also comprise a rotor in and of itself. It will be understood that linear inertia charger 70 (as well as any type of inertia charger) may produce direct current eliminating the need for rectifier 60.

By way of an additional example, and as is shown in FIG. 1, inertia charger 70 may comprise a torsional inertia charger which can be attached to handle 36. In this embodiment, the torsional inertia charger may comprise a rotor which is connected to at least a portion of handle 36 and is positioned inside housing 20. Preferably, the rotor turns within a stator positioned within the housing or on the handle which produces an alternating current. The torsional inertia charger communicates this alternating current to rectifier 60 which converts the alternating current to direct current. Rectifier 60 communicates direct current to secondary electrochemical cell 50 for recharging of the same, and/or to capacitor 140 for storage of the same. It will be understood that torsional inertia charger 70 may produce direct current eliminating the need for rectifier 60.

Figure 3:
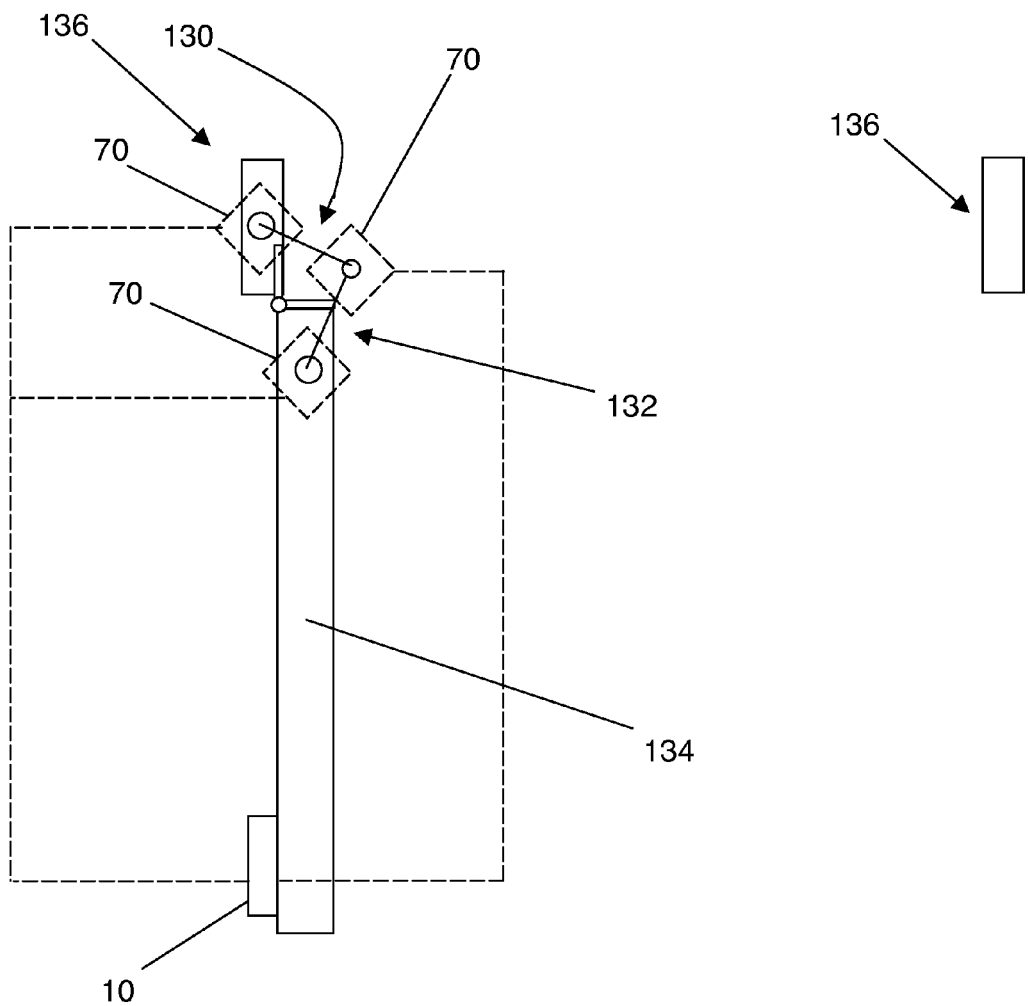
FIG. 3 of the drawings is a top-down plan view of a door linkage sub-assembly associated with a door lock assembly.

Referring now to FIG. 3, door linkage sub-assembly 130 comprises, for example, a set of mechanical linkages 132 associated with door 134 and door frame 136. These mechanical linkages cooperate to regulate movement during the opening and closing of a door. Door linkage sub-assembly 130 further comprises one or more torsional inertia chargers 70 which recover otherwise lost mechanical energy produced by the opening and/or closing of a door and converts the mechanical energy to electrical energy. Inertia chargers 70 which are associated with door linkage sub-assembly 130 communicate with secondary electrochemical cell 50, and/or capacitor 140 in the same manner that previously mentioned inertia chargers 70 communicate.

Figure 4:
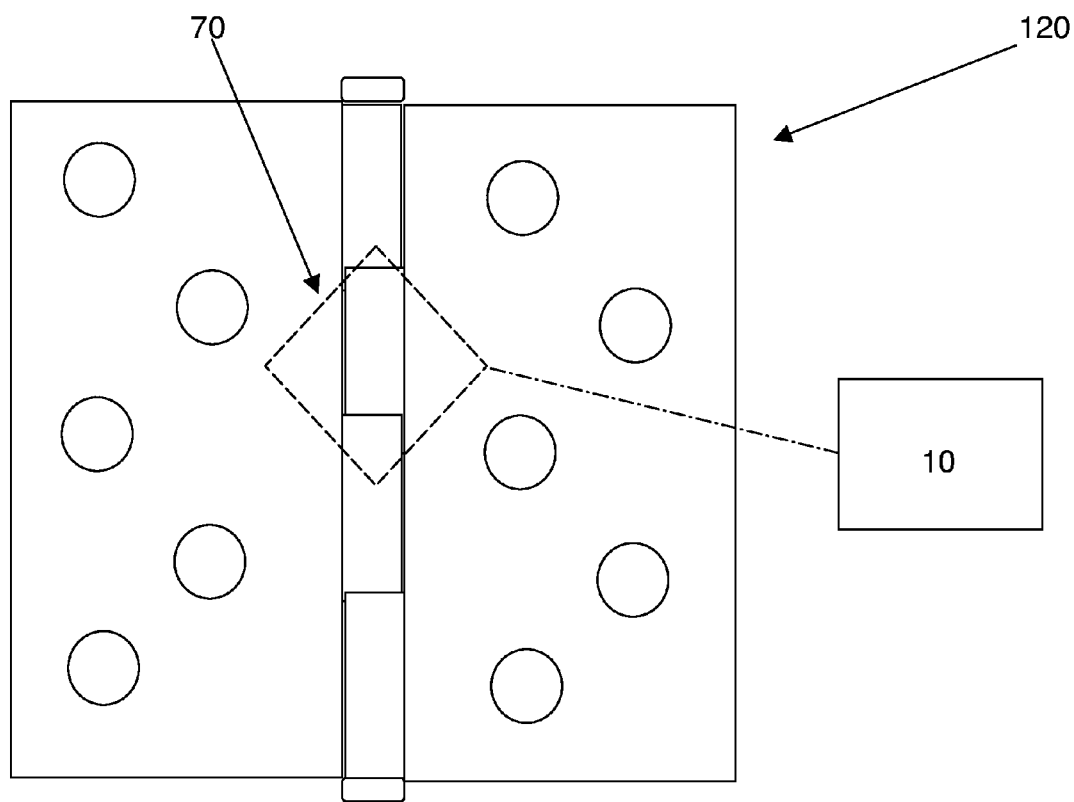
FIG. 4 of the drawings is an elevational view of an inertia charger associated with a door hinge.

Referring now to FIG. 4, door hinge 120 comprises, for example, a typical door hinge associated with an inertia charger 70. As with inertia charger 70 associated with door linkage sub-assembly 130, inertia charger 70 associated with door hinge 120 recovers mechanical energy produced by opening and/or closing a door and coverts that mechanical energy into electrical energy. Inertia chargers 70 which are associated with door hinge 120 communicate with secondary electrochemical cell 50 and/or capacitor 140 in the same manner that previously mentioned inertia chargers 70 communicate.

Referring once again to FIG. 1, the housing also preferably comprises a bolt safety controller 80, an energy flow controller 90, and/or an energy switch 100.

As is best shown in FIG. 1, capacitor 140, is at least partially positioned within housing 20, and is in electrical communication with energy switch 100 and receives energy from inertia charger 70 and/or rectifier 60. Bolt safety controller 80 communicates with capacitor 140 which, in turn, communicates energy to bolt safety 34.

It will be understood that bolt safety controller 80 receives input from user interface member 40. The bolt safety controller communicates with bolt safety 34 and receives direct current from secondary electrochemical cell 50 and/or capacitor 140. By way of example, when the output of the user interface member is a lock output, then bolt safety controller 80 communicates with bolt safety 34 and the bolt safety changes to the engaged (or maintains the engaged), locked bolt position. It will be understood that the bolt safety changes to the engaged, locked bolt position only if bolt 32 is in the locked position. By way of another example, when the output of user interface member 40 communicates an unlock output to bolt safety controller 80, the bolt safety controller communicates with bolt safety 34 and the bolt safety changes to the disengaged, unlocked bolt position, and allows a user to displace bolt 32 from the locked position to the unlocked position by actuating handle 36. It will be understood that if a user does not actuate the handle and displace the bolt within a period of time (e.g. 30 seconds), bolt safety controller 80 automatically communicates with bolt safety 34 and the bolt safety changes to the engaged, bolt locked position for security purposes.

In one embodiment, energy flow controller 90 communicates with bolt safety 34, secondary electrochemical cell 50, inertia charger 70, and energy switch 100.

In accordance with the present invention, energy flow controller 90 changes energy switch 100 from the charge position to the discharge position—and vice versa.

For purposes of the present disclosure, energy switch 100 comprises charge and discharge positions which facilitates the flow of direct current. In particular, when the energy switch is in the charge position it allows communication (e.g. direct current) from rectifier 60 to secondary electrochemical cell 50. When the energy switch is in the discharge position it allows communication (e.g. direct current) from secondary electrochemical cell 50 to bolt safety 34.

In operation, in one embodiment, a user inputs an access member (e.g. an access card, a fingerprint, an alpha-numeric code, etcetera) into the user interface member. After the user interface member reads, for example, the access card, and determines the access card is valid, then the user interface member communicates an unlock output to bolt safety controller 80. Next, energy flow controller 90 communicates with energy switch 100, and the energy switch changes to the discharge position, which allows energy to flow from secondary electrochemical cell 50 to bolt safety 34. Also, capacitor 140 may communicate energy to bolt safety 34 without use of the energy switch upon communication from bolt safety controller 80 to capacitor 140. Bolt safety 34 subsequently changes to the disengaged, unlocked bolt position. After bolt safety 34 changes to the disengaged, unlocked bolt position, a user actuates handle 36 from the first position to the second position thereby displacing bolt 32 from the locked position to the unlocked position.

Concurrently, as the user actuates handle 36 from the first position to the second position, a torsional inertia charger which comprises a rotor attached to the handle, turns within a stator positioned within housing 20 or connected to handle 36. The torsional inertia charger generates an alternating current and communicates the alternating current to rectifier 60. The rectifier (if needed) then converts the alternating current to direct current. Rectifier 60 may not be necessary if torsional inertia charger 70 produces direct current, in and of itself. Next, energy flow controller 90 communicates with energy switch 100, and the energy switch changes to the charge position, which allows direct current to flow from rectifier 60 to secondary electrochemical cell 50. Capacitor 140 may communicate energy to bolt safety 34 without use of the energy switch upon communication from bolt safety controller 80 to capacitor 140. In conjunction with the torsional inertia charger, as the user actuates handle 36 from the first position to the second position, a linear inertia charger which comprises a rotor attached to bolt 32 reciprocates within a stator positioned within housing 20. The linear inertia charger produces alternating current. In one preferred embodiment, bolt 32 may also be a rotor, in and of itself. The linear inertia charger communicates alternating current to rectifier 60 (if needed) and the rectifier converts the alternating current to direct current. Rectifier 60 may not be necessary if linear inertia charger 70 produces direct current, in and of itself. Next, energy flow controller 90 communicates with the energy switch 100, and the energy switch changes to the charge position, and allows energy to flow from rectifier 60 to secondary electrochemical cell 50.

It will be understood that the devices provided herein enable a secondary electrochemical cell to be replaced substantially less frequently, which can result in substantial cost savings for entities such as hotels and commercial buildings.

The foregoing description merely explains and illustrates the invention and the invention is not limited thereto except insofar as the appended claims are so limited, as those skilled in the art who have the disclosure before them will be able to make modifications without departing from the scope of the invention.

What is claimed and desired to be secured by Letters Patent of the United States is:

1. A door lock assembly, comprising:
   a housing, wherein the housing comprises a first wall and a second wall, and wherein the first and second walls are spaced apart from one another to define a cavity therebetween;
   a lock sub-assembly which comprises:
      a bolt, wherein the bolt is at least partially positioned within the housing, and wherein the bolt is displaceable between a locked position and an unlocked position; and a bolt safety, wherein the bolt safety is at least partially positioned within the housing, and wherein the bolt safety is positionable between an engaged, locked bolt position and a disengaged, unlocked bolt position;

a user interface member, wherein the user interface member is associated with the housing, and wherein the user interface member at least one of mechanically and electrically communicates with the bolt safety;

at least one of a secondary electrochemical cell and a capacitor, wherein at least one of the at least one secondary electrochemical cell and capacitor is associated with the housing and communicates with at least one of the bolt safety and the user interface member; and an energy generator, wherein the energy generator comprises at least one of an inertia charger and a solar cell and wherein the energy generator communicates with at least one of the at least one secondary electrochemical cell and capacitor.

2. A door lock assembly, comprising:

a housing, wherein the housing comprises a first wall and a second wall, and wherein the first and second walls are spaced apart from one another to define a cavity therebetween;

a lock sub-assembly which comprises:

a bolt, wherein the bolt is at least partially positioned within the housing, and wherein the bolt is displaceable between a locked position and an unlocked position; and a bolt safety, wherein the bolt safety is at least partially positioned within the housing, and wherein the bolt safety is positionable between an engaged, locked bolt position and a disengaged, unlocked bolt position;

a user interface member, wherein the user interface member is associated with the housing, and wherein the user interface member at least one of mechanically and electrically communicates with the bolt safety;

a secondary electrochemical cell, wherein the secondary electrochemical cell is associated with the housing, and wherein the secondary electrochemical cell communicates with at least one of the bolt safety and the user interface member; and an inertia charger, wherein the inertia charger communicates with the secondary electrochemical cell.

3. The door lock assembly according to claim 2, wherein the inertia charger is at least partially positioned within the housing.

4. The door lock assembly according to claim 2, further comprising a handle, wherein the handle is at least partially positioned within the housing, and wherein the handle comprises a first position and a second position and wherein the handle is associated with the bolt.

5. The door lock assembly according to claim 4, wherein a first inertia charger comprises at least one of a linear inertia charger, a torsional inertia charger, and a vibrational inertia charger associated with the handle and wherein a second inertia charger comprises at least one of a linear inertia charger, a torsional inertia charger, and a vibrational inertia charger associated with the bolt.

6. The door lock assembly according to claim 4, wherein the inertia charger comprises a linear inertia charger associated with the bolt and a torsional inertia charger associated with the handle.

7. The door lock assembly according to claim 2, wherein the lock sub-assembly further comprises a rectifier, wherein the rectifier is at least partially positioned within the housing.

8. The door lock assembly according to claim 7, wherein the rectifier receives an alternating current from the inertia charger and communicates a direct current to the secondary electrochemical cell.

9. The door lock assembly according to claim 2, wherein the lock sub-assembly further comprises a capacitor, wherein the capacitor is at least partially positioned within the housing.

10. The door lock assembly according to claim 2, wherein the inertia charger comprises at least one of a linear inertia charger and a torsional inertia charger.

11. The door lock assembly according to claim 2, wherein the inertia charger comprises a torsional inertia charger associated with the user interface member.

12. The door lock assembly according to claim 2, wherein the inertia charger is associated with a hinge on a door.

13. The door lock assembly according to claim 2, further comprising a door linkage sub-assembly, wherein the door linkage sub-assembly comprises a mechanical apparatus for regulating movement of a door and an inertia charger which communicates with the door lock apparatus.

14. The door lock assembly according to claim 2, further comprising a solar cell, wherein the solar cell communicates with the door lock assembly.

15. The door lock assembly according to claim 2, wherein the inertia charger comprises at least one of a linear inertia charger, a torsional inertia charger, a vibrational inertia charger, and a compressional charger.

16. The door lock assembly according to claim 2, wherein the secondary electrochemical cell comprises at least one of an alkaline, a lead acid, a nickel-cadmium, a nickel metal hydride, a lithium-ion, and a lithium ion polymer secondary electrochemical cell.

17. The door lock assembly according to claim 2, wherein the user interface member comprises at least one of a card access interface, a biometric access interface, an alpha-numeric access interface, a radio frequency identification access interface, an infrared access interface, a magnetic access interface, and combinations thereof.

18. The door lock assembly according to claim 2, further comprising a bolt safety controller, an energy flow controller, and an energy switch.

19. The door lock assembly according to claim 18, further comprising an energy flow controller which communicates with the inertia charger, and an energy switch.

20. The door lock assembly according to claim 18, wherein the energy switch comprises a discharge position and a recharge position.

21. The door lock assembly according to claim 20, further wherein the energy switch, the user interface member, the energy flow controller, the bolt safety, the bolt safety controller, the inertia charger, solar cell, capacitor, and the secondary electrochemical cell are all in communication with one another.

22. A door lock assembly, comprising:

a housing, wherein the housing comprises a first wall and a second wall, and wherein the first and second walls are spaced apart from one another to define a cavity therebetween;

a lock sub-assembly which comprises:

a bolt, wherein the bolt is at least partially positioned within the housing, and wherein the bolt is displaceable between a locked position and an unlocked position; and a bolt safety, wherein the bolt safety is at least partially positioned within the housing, and wherein the bolt safety is positionable between an engaged, locked bolt position and a disengaged, unlocked bolt position;

a user interface member, wherein the user interface member is associated with the housing, and wherein the user interface member at least one of mechanically and electrically communicates with the bolt safety;

a secondary electrochemical cell, wherein the secondary electrochemical cell is associated with the housing, and wherein the secondary electrochemical cell communicates with at least one of the bolt safety and the user interface member; and a solar cell, wherein the solar cell is associated with the door lock apparatus, and wherein the solar cell communicates with the secondary electrochemical cell.

* * * * *